United States Patent
Maroney

(10) Patent No.: US 12,339,792 B2
(45) Date of Patent: Jun. 24, 2025

(54) CONTROLLING AGGREGATION FOR HRAM

(71) Applicant: Micron Technology, Inc., Boise, ID (US)

(72) Inventor: John Maroney, Irvine, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/235,133

(22) Filed: Aug. 17, 2023

(65) Prior Publication Data

US 2024/0070094 A1 Feb. 29, 2024

Related U.S. Application Data

(60) Provisional application No. 63/401,832, filed on Aug. 29, 2022.

(51) Int. Cl.
| | | |
|---|---|---|
| *G06F 13/16* | (2006.01) | |
| *G06F 12/02* | (2006.01) | |
| *G06F 13/18* | (2006.01) | |

(52) U.S. Cl.
CPC ...... *G06F 13/1673* (2013.01); *G06F 12/0246* (2013.01); *G06F 13/1647* (2013.01); *G06F 13/18* (2013.01); *G06F 2212/7201* (2013.01)

(58) Field of Classification Search
CPC .. G06F 13/1673; G06F 13/18; G06F 12/0246; G06F 13/1647; G06F 2212/7201
See application file for complete search history.

(56) References Cited

U.S. PATENT DOCUMENTS

| | | | | |
|---|---|---|---|---|
| 6,564,304 | B1* | 5/2003 | Van Hook | G06F 13/1626 710/39 |
| 2008/0162799 | A1* | 7/2008 | Spry | G06F 13/1642 711/104 |
| 2008/0320209 | A1* | 12/2008 | Lee | G06F 12/0246 711/E12.001 |
| 2009/0100206 | A1* | 4/2009 | Wang | G06F 13/1673 710/112 |
| 2018/0364947 | A1* | 12/2018 | Jean | G06F 3/064 |

(Continued)

OTHER PUBLICATIONS

"NVMe Standard version 1.4", [Online]. Retrieved from the Internet: https: nvmexpress.org wp-content uploads NVM-Express-1_4-2019.06.10-Ratified.pdf, (Jun. 10, 2019), 263 pages.

(Continued)

*Primary Examiner* — Mark A Giardino, Jr.
(74) *Attorney, Agent, or Firm* — Schwegman Lundberg & Woessner, P.A.

(57) ABSTRACT

A method for controlling aggregation for HRAM comprises a processing device, using a buffer manager, to receive instructions that include smaller-sized block write instructions from a host system. The processing device, using an aggregation engine, aggregates the smaller-sized block write instructions from the buffer manager into a plurality of larger-sized write instructions. The processing device issues a burst write instruction comprising the larger-sized write instructions to the memory component via the interface. The memory component can be HRAM and the interface can be a modified DDR-L5 interface for HRAM. Other embodiments are described herein.

20 Claims, 5 Drawing Sheets

(56) References Cited

U.S. PATENT DOCUMENTS

2020/0210105 A1\* 7/2020 Rori .................... G11C 29/028
2021/0096860 A1\* 4/2021 Sade .................... G06F 9/3858
2022/0187989 A1\* 6/2022 Resch ................... G06F 3/0629

OTHER PUBLICATIONS

"Compute Express Link™ (CXL™) Specification Revision 3.1", [Online]. Retrieved from the Internet: https: computeexpresslink. org cxl-specification , (Aug. 7, 2023), 1166 pages.

\* cited by examiner

CONTROLLING AGGREGATION FOR HRAM

PRIORITY APPLICATION

This application claims the benefit of priority to U.S. Provisional Application Ser. No. 63/401,832, filed Aug. 29, 2022, which is incorporated herein by reference in its entirety.

TECHNICAL FIELD

Embodiments of the disclosure relate generally to memory sub-systems and more specifically to a hybrid controller that controls the aggregation of multiple smaller block write instructions (e.g., 4 bytes to 64 bytes) into larger write instructions suitable for burst write instructions to a holographic random access memory (HRAM) in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE SEVERAL VIEWS OF THE DRAWINGS

The present disclosure will be understood more fully from the detailed description given below and from the accompanying drawings of various embodiments of the disclosure.

DETAILED DESCRIPTION

Figure 1:
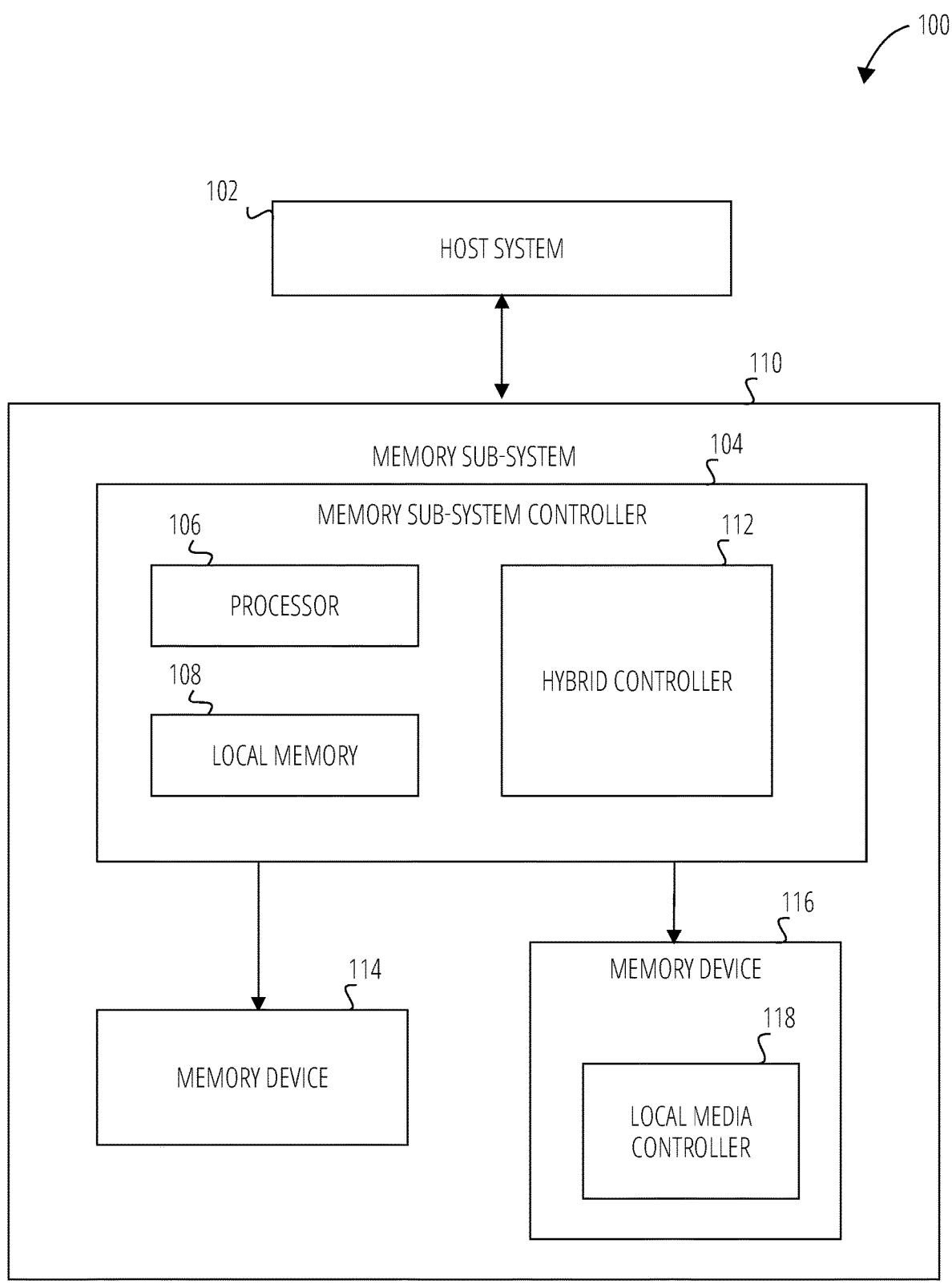
FIG. 1 is a block diagram illustrating an example computing system that includes a memory sub-system, in accordance with some embodiments of the present disclosure.

Aspects of the present disclosure are directed to controlling aggregation of instructions for HRAM in a memory sub-system. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

As usage models for the memory sub-systems and storage devices evolve, the memory sub-systems need to evolve to be compatible with technology advances. Furthermore, memory devices such as negative-and (NAND) memory and programming logic may not sufficiently align with expectations from the host system.

Aspects of the present disclosure address deficiencies of conventional memory sub-systems by incorporating holographic random access memory (HRAM) that allow for emerging customer use cases. HRAM is a non-volatile persistent memory that can be half the cost per Gigabyte (GB) of dynamic random access memory (DRAM) with the performance, endurance, and interface that is similar to DRAM. In comparison to DRAM, HRAM is larger in density (e.g., 64 Gigabytes which is 2 to 4 times greater than DRAM) but the latency is the main drawback for HRAM, which can be 2 to 3 times that of DRAM. As further described below, the memory sub-system comprises a hybrid controller that controls aggregation of instructions in order to improve the latency performance of HRAM such that it is rendered equal in latency performance to dynamic random access memory (DRAM).

One example of an application that is rendered possible with HRAM and the hybrid controller is that the large memory density of HRAM can allow for larger logical-to-physical (L2P) maps such that L2P caching to NAND is prevented for large SSDs and thereby improving performance.

Another example application is in the non-volatile repository for maps and logs. In conventional memory sub-systems, L2P maps and logs get updated in DRAM every write or GC operation and then periodically updated to NAND. Async power loss (APL) major events require hold up caps for flushing DRAM to NAND, so the size is limited. With HRAM and the hybrid controller, HRAM can store the L2P maps and logs such that these structures are in non-volatile memory and thereby, not requiring the periodic updates to NAND. This allows for a better quality of service (QoS) and performance as fewer NAND writes are injected into the memory sub-system; saves capacitor costs, which frees board area; and provides for faster boot time.

Additionally, given the larger size of the HRAM, other benefits can include providing a persistent memory region (PMR) support (e.g., PCIe region) stored in HRAM, providing a coherent PMR over CXL protocol, providing several Gigabytes of non-volatile cache that is extended to QLC NAND endurance or several Gigabytes of a caching layer that allows for more effective and more scalable data caching, storing a large non-volatile RAIN buffer in the HRAM, as well as storing the controller memory buffer (CMB) in the HRAM, etc.

Further, in automotive applications, HRAM can provide up to 16 Gigabytes of non-volatile cyclic buffer for automotive black box recording and the HRAM can also allow the resume boot image to always be present which allows for an instant-on upon vehicle start-up.

FIG. 1 illustrates an example computing system 100 that includes a memory sub-system 110, in accordance with some embodiments of the present disclosure. The memory sub-system 110 can include media, such as one or more volatile memory devices (e.g., memory device 114), one or more non-volatile memory devices (e.g., memory device 116), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 110. In some embodiments, the host system 102 is coupled to different types of memory sub-system 110. FIG. 1 illustrates one example of a host system 102 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 110, for example, to write data to the memory sub-system 110 and read data from the memory sub-system 110.

The host system 102 can be coupled to the memory sub-system 110 via a host interface. Examples of a host interface include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 102 and the memory sub-system 110. The host system 102 can further utilize an NVM Express (NVMe) interface to access components (e.g., memory devices 116) when the memory sub-system 110 is coupled with the host system 102 by the PCIe interface. The host interface can provide an interface for passing control, address, data, and other signals between the memory sub-system 110 and the host system 102. FIG. 1 illustrates a memory sub-system 110 as an example. In general, the host system 102 can access multiple memory sub-systems via a same communication connection, multiple separate communication connections, and/or a combination of communication connections.

The memory devices 114, 116 can include any combination of the different types of non-volatile memory devices and/or volatile memory devices. The volatile memory devices (e.g., memory device 114) can be, but are not limited to, random access memory (RAM), such as dynamic random access memory (DRAM) and synchronous dynamic random access memory (SDRAM).

Some examples of non-volatile memory devices (e.g., memory device 116) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 116 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory device 116 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory device 116 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 116 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 116 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), holographic RAM (HRAM), NOR flash memory, and electrically erasable programmable read-only memory (EEPROM).

In one example, the non-volatile memory devices (e.g., memory device 116) includes HRAM. The HRAM density can be 64 Gigabytes such that the size of persistent memory regions can be in the magnitude of Gigabytes. Accordingly, HRAM can host different applications such as non-volatile instant boot image, non-volatile L2P table, non-volatile CMB queues and write buffers, PMR PCIe Bar or CXL access memory, non-volatile write cache or cyclic buffer for automotive, non-volatile output NAND RAIN buffer, etc. With the increase in available size for non-volatile storage in the HRAM, persistent memory regions can now be multiple Gigabytes in the HRAM and are not limited by the PLP hold-up capacitors.

The memory sub-system controller 104 (or controller 104 for simplicity) can communicate with the memory devices 116 to perform operations such as reading data, writing data, or erasing data at the memory devices 116 and other such operations. The memory sub-system controller 104 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can include a processor 106 (processing device) configured to execute instructions stored in a local memory 108. In the illustrated example, the local memory 108 of the memory sub-system controller 104 includes an embedded memory configured to store instructions for performing various processes, operations, logic flows, and routines that control operation of the memory sub-system 110, including handling communications between the memory sub-system 110 and the host system 102.

In some embodiments, the local memory 108 can include memory registers storing memory pointers, fetched data, and the like. The local memory 108 can also include ROM for storing micro-code. While the example memory sub-system 110 in FIG. 1 has been illustrated as including the memory sub-system controller 104, in another embodiment of the present disclosure, a memory sub-system 110 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 116 and/or the memory device 114. The memory sub-system controller 104 can be responsible for other operations such as wear-leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 116. The memory sub-system controller 104 can further include host interface circuitry to communicate with the host system 102 via the physical host interface. The host interface circuitry can convert the commands received from the host system 102 into command instructions to access the memory devices 116 and/or the memory device 114 and convert responses associated with the memory devices 116 and/or the memory device 114 into information for the host system 102.

In some embodiments, the memory devices 116 include local media controller 118 that operate in conjunction with memory sub-system controller 104 to execute operations on one or more memory cells of the memory devices 116 and 114.

The memory sub-system 110 also includes a hybrid controller 112 that is responsible for controlling aggregation for HRAM within the memory sub-system 110. Further details regarding the aggregation of instructions for the HRAM by the hybrid controller 112 are discussed below.

In some embodiments, the memory sub-system controller 104 includes at least a portion of the hybrid controller 112. For example, the memory sub-system controller 104 can include a processor 106 (processing device) configured to execute instructions stored in local memory 108 for performing the operations described herein. In some embodiments, the hybrid controller 112 is part of the host system 102, an application, or an operating system. In some embodiments, the local media controller 118 includes at least a portion of the hybrid controller 112.

Figure 2:
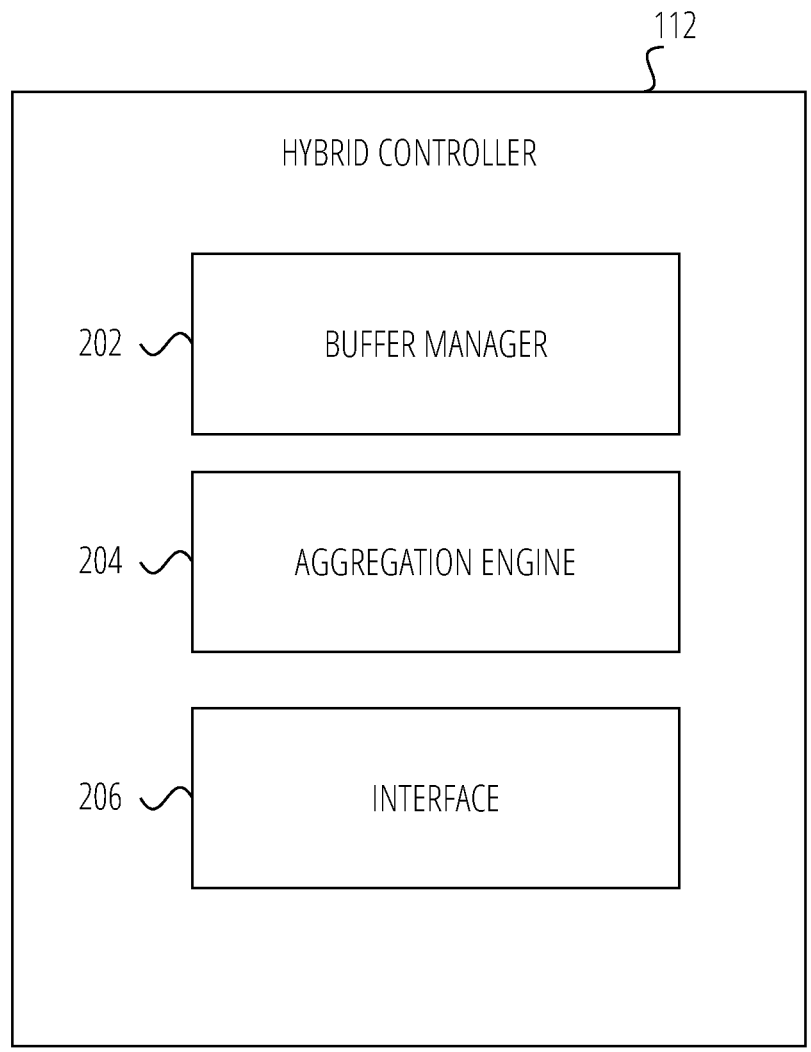
FIG. 2. is a block diagram illustrating an example of the components in hybrid controller 112 in accordance with some embodiments of the present disclosure.

While not shown in FIG. 1, the memory sub-system 110 can further include a power management integrated circuit (PMIC), PLP capacitors for data in the buffer manager 202 described in FIG. 2 and NAND caches.

FIG. 2 is a block diagram illustrating an example of the components in hybrid controller 112 in accordance with some embodiments of the present disclosure. The hybrid controller 112 can control the data flow and instructions for different types of non-volatile memory device 116 including NAND and HRAM in memory sub-system 110. The hybrid controller 112 can also control data flow and instructions to volatile memory devices 114 such as DRAM.

As shown in FIG. 2, the hybrid controller 112 can include a buffer manager 202, an aggregation engine 204, and an interface 206. While not shown in FIG. 2, the memory sub-system controller 104 or the hybrid controller 112 can further include a host interface (e.g., PCIe/NVMe interface), AES encryption/decryption engine, a security engine and processor, CPU complex, and physical NAND interface and ECC engine.

The aggregation engine 204 can be a specialized hardware (HW) state machine or a first-in-first-out (FIFO) engine. The aggregation engine 204 controls the aggregation of the data and instructions to the HRAM in order to overcome the increased latency cause by using HRAM over DRAM for various applications. The initial latency hit can be three times more than DRAM's latency such that the aggregation engine 204 aggregates multiple smaller-sized block write instructions into larger-sized write instructions that are of a suitable size for burst writes to HRAM with a wide multi-client priority arbiter. In one example, the aggregation engine 204 determines that the smaller-sized block write instructions are associated with the HRAM type non-volatile memory device 116 and in response to determining that the smaller-sized block write instructions are associated with HRAM, the aggregation engine 204 aggregates the smaller-sized block write instructions into larger block write instructions for the burst write to HRAM. The smaller-sized block write instructions can be 4 bytes to 64 bytes in size, for example. If the aggregation engine 204 has a larger SRAM, for example, the aggregation engine 204 can also aggregate larger instructions (e.g., 4 Kilobyte read/write instructions) to further improve HRAM transfer efficiency.

The aggregation engine 204 can also pre-fetch read data. The pre-fetch read data can be stored in the aggregation engine 204. To further optimize the performance of HRAM in the memory sub-system 110, the aggregation engine 204 can prioritize read instructions over write instructions received and can interleave the read instructions with the write instructions. Additionally, the aggregation engine 204 can perform wear-leveling operations for the HRAM.

The buffer manager 202 of the hybrid controller 112 can include an SRAM buffer and a manager controller that controls the contents of the SRAM buffer. In contrast to conventional controllers, the SRAM buffer can be of a smaller size. The SRAM buffer in the buffer manager 202 can store data and instructions. For example, the SRAM buffer can store the instructions (e.g., the smaller block write instructions) prior to being aggregated by the aggregation engine 204, data from HRAM to be cached in NAND, data from NAND memory, etc.

The hybrid controller 112 can communicate with HRAM via the interface 206. The interface 206 can provide an interface for passing data and instructions to the HRAM or receiving data from the HRAM. For example, the interface 206 can be a modified DDR-LP5 interface to support additional CA and command timing for HRAM, which can further include applications used for persistent HRAM memory.

Figure 3:
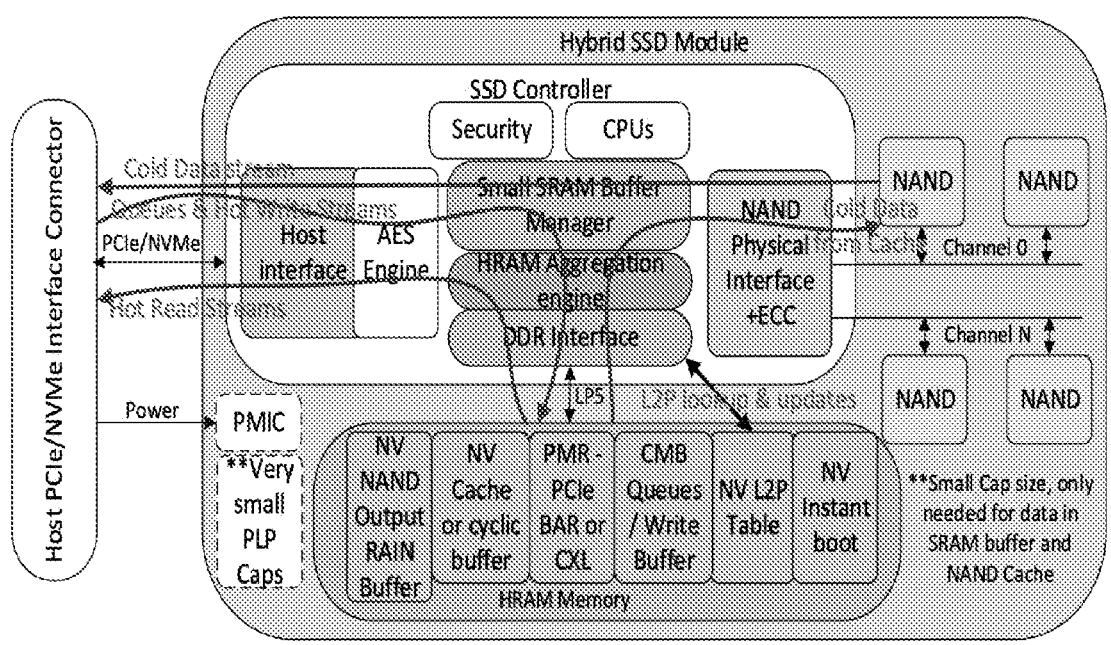
FIG. 3 illustrates an example of the data flows through the computer system in accordance with one embodiment.

FIG. 3 illustrates an example of the data flows through the computer system in accordance with one embodiment. As shown in FIG. 3, the data flows via the hybrid controller 112 can include: (1) Queues and Hot Write IO streams to HRAM (e.g., either PMR, CMB queues and write buffer, non-volatile cache or non-volatile cyclic buffer, or non-volatile output RAIN buffer indirectly); (2) Hot Read IO streams from HRAM (e.g., PMR or non-volatile cache); (3) Cold data from HRAM (e.g., non-volatile cache, PMR, non-volatile output RAIN buffer or CMB write buffer); and (4) Cold data from NAND that is not cached.

Figure 4:
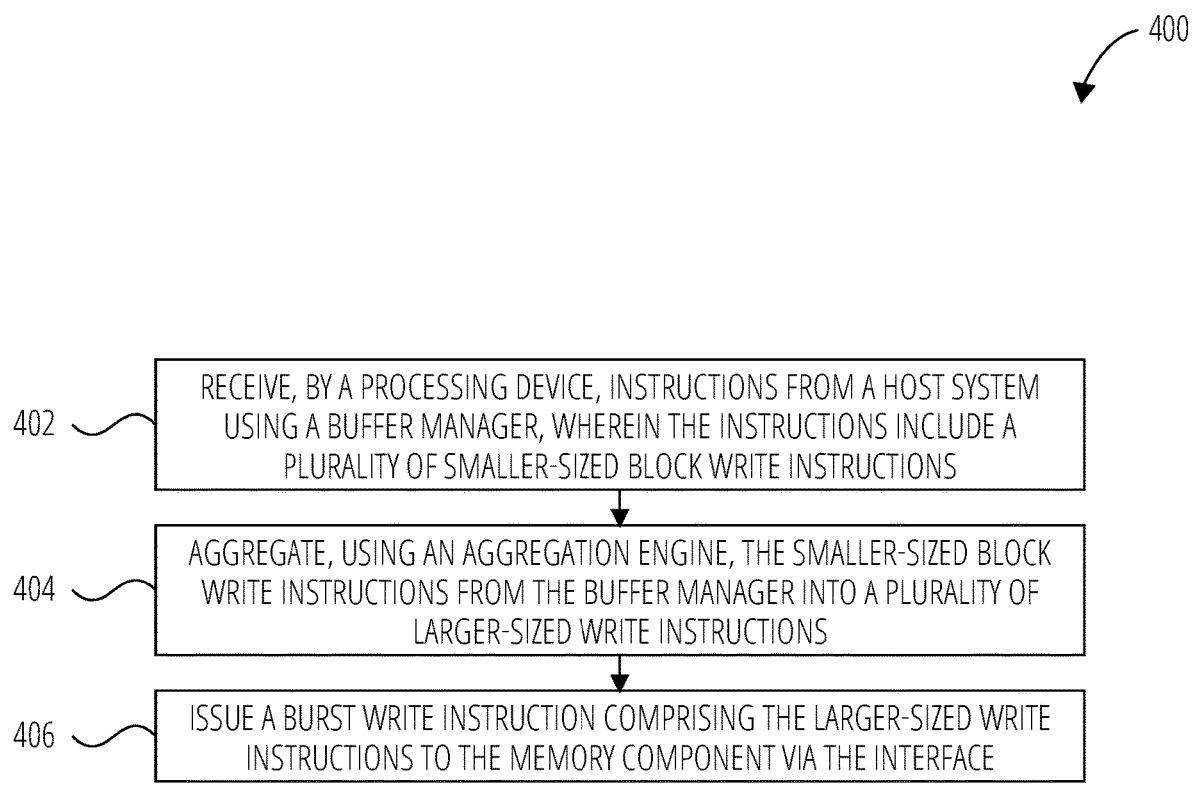
FIG. 4 is a flow diagram illustrating a method for controlling aggregation for HRAM, in accordance with some embodiments of the present disclosure.

FIG. 4 is a flow diagram illustrating a method for controlling aggregation for HRAM, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the hybrid controller 112 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 400 starts, at operation 402, with a processing device, using a buffer manager, to receive instructions that include smaller-sized block write instructions from a host system. The buffer manager can be a Static Random Access Memory (SRAM) buffer manager.

The processing device can receive instructions associated with different memory components (e.g., NAND, DRAM, etc.) from the host system. In one example, the processing device can determine that the instructions are associated with a memory component that is HRAM. In response to determining that the instructions are HRAM instructions or HRAM write instructions, the processing device can perform aggregation of the instructions in operation 404.

The processing device, in operation 404, aggregates, using an aggregation engine, the smaller-sized block write instructions from the buffer manager into a plurality of larger-sized write instructions. The aggregation engine can be a hardware state machine or first-in-first-out (FIFO) engine that is configured to perform the aggregation in operation 404.

The processing device, in operation 406, issues a burst write instruction comprising the larger-sized write instructions to the memory component via the interface. The interface can be an HRAM modified interface such as a modified DDR-LP5 interface. The processing device can issue the burst write instruction using a wide multi-client priority arbiter.

The processing device can also receive read instructions from the host system including read instructions associated with HRAM. In this example, the processing device can pre-fetch read data associated with the read instruction into the aggregation engine.

The processing device can further prioritize the read instruction over the smaller-sized block write instructions or the burst write instruction. The processing device can interleave the read instruction with the smaller-sized block write instructions or the burst write instruction. In one example, the processing device use the aggregation engine to interleave 2 to 4 transfers (e.g., read and writes) into a single back-to-back transfer. The read instructions being interleaved can be the read instructions associated with the HRAM (e.g., HRAM read instructions).

With the larger non-volatile memory capacity of HRAM, HRAM can store a non-volatile logical-to-physical mapping (L2P) table. In this example, the processing device can update a non-volatile logical-to-physical mapping (L2P) table in the memory component (e.g., HRAM). The processing device can also use the aggregation engine to perform wear-leveling operations for the memory component.

Embodiments of the memory sub-system 110 described in the present disclosure improves on the conventional memory sub-systems by incorporating HRAM into the memory sub-system 110, with HRAM providing a non-volatile persistent memory at half the cost per Gigabyte (GB) of DRAM with the performance, endurance, and interface being similar to DRAM. Additionally, the memory sub-system controller 104 with the hybrid controller 112 provides further improvements to the memory sub-system 110 by controlling aggregation of instructions which effectively improve the latency performance of HRAM such that it is rendered equal in latency performance to DRAM. Accordingly, the memory sub-system 110 allow for emerging uses and applications that are rendered possible with HRAM and the hybrid controller 112.

EXAMPLES

Described implementations of the subject matter can include one or more features, alone or in combination as illustrated below by way of example.

Example 1 is a memory sub-system comprising: a memory component; and a processing device, operatively coupled with the memory component, to perform operations comprising: receiving instructions from a host system using a buffer manager, wherein the instructions include a plurality of smaller-sized block write instructions; aggregating, using an aggregation engine, the smaller-sized block write instructions from the buffer manager into a plurality of larger-sized write instructions; and issuing a burst write instruction comprising the larger-sized write instructions to the memory component via the interface.

Example 2 includes the memory sub-system of Example 1, wherein the memory component is a holographic random access memory (HRAM).

Example 3 includes the memory sub-system of any one or more of Examples 1 or 2, wherein issuing the burst write instruction comprises issuing the burst write instruction using a wide multi-client priority arbiter.

Example 4 includes the memory sub-system of Example 1, wherein the aggregation engine is a hardware state machine or first-in-first-out (FIFO) engine.

Example 5 includes the memory sub-system of Example 1, wherein the operations further comprise: pre-fetching read data associated with a read instruction into the aggregation engine.

Example 6 includes the memory sub-system of any one or more of Examples 1 or 5, wherein the operations further comprise: prioritizing the read instruction over the smaller-sized block write instructions or the burst write instruction.

Example 7 includes the memory sub-system of any one or more of Examples 1, 5, or 6, wherein the operations further comprise: interleaving the read instruction with the smaller-sized block write instructions or the burst write instruction.

Example 8 includes the memory sub-system of Example 1, wherein the operations further comprise: performing wear-leveling operations for the memory component.

Example 9 includes the memory sub-system of Example 1, wherein the buffer manager is a small Static Random Access Memory (SRAM) buffer manager and the interface is an HRAM modified interface.

Example 10 includes the memory sub-system of Example 1, wherein the operations further comprise: updating a non-volatile logical-to-physical mapping (L2P) table in the memory component.

Example 11 includes the memory sub-system of Example 1, wherein each of the smaller-sized write instructions are between 4 bytes to 64 bytes.

Example 12 is a method comprising: receiving, by a processing device, instructions from a host system using a buffer manager, wherein the instructions include a plurality of smaller-sized block write instructions; aggregating, using an aggregation engine, the smaller-sized block write instructions from the buffer manager into a plurality of larger-sized write instructions; and issuing a burst write instruction comprising the larger-sized write instructions to the memory component via the interface.

Example 13 includes the method of Example 12, wherein the memory component is a holographic random access memory (HRAM), wherein issuing the burst write instruction comprises issuing the burst write instruction using a wide multi-client priority arbiter.

Example 14 includes the method of Example 12, wherein the aggregation engine is a hardware state machine or first-in-first-out (FIFO) engine.

Example 15 includes the method of Example 12, further comprising: pre-fetching read data associated with a read instruction into the aggregation engine.

Example 16 includes the method of Example 12 or 15, further comprising: prioritizing the read instruction over the smaller-sized block write instructions or the burst write instruction; and interleaving the read instruction with the smaller-sized block write instructions or the burst write instruction.

Example 17 includes the method of Example 12, further comprising: performing wear-leveling operations for the memory component.

Example 18 includes the method of Example 12, wherein the buffer manager is a small Static Random Access Memory (SRAM) buffer manager and the interface is an HRAM modified interface.

Example 19 includes the method of Example 12, further comprising: updating a non-volatile logical-to-physical mapping (L2P) table in the memory component.

Example 20 is a non-transitory computer-readable storage medium comprising instructions that, when executed by a processing device, cause the processing device to perform operations comprising: receiving instructions from a host system using a buffer manager, wherein the instructions include a plurality of smaller-sized block write instructions; aggregating, using an aggregation engine, the smaller-sized block write instructions from the buffer manager into a plurality of larger-sized write instructions; and issuing a burst write instruction comprising the larger-sized write instructions to the memory component via the interface.

Example Computer System

Figure 5:
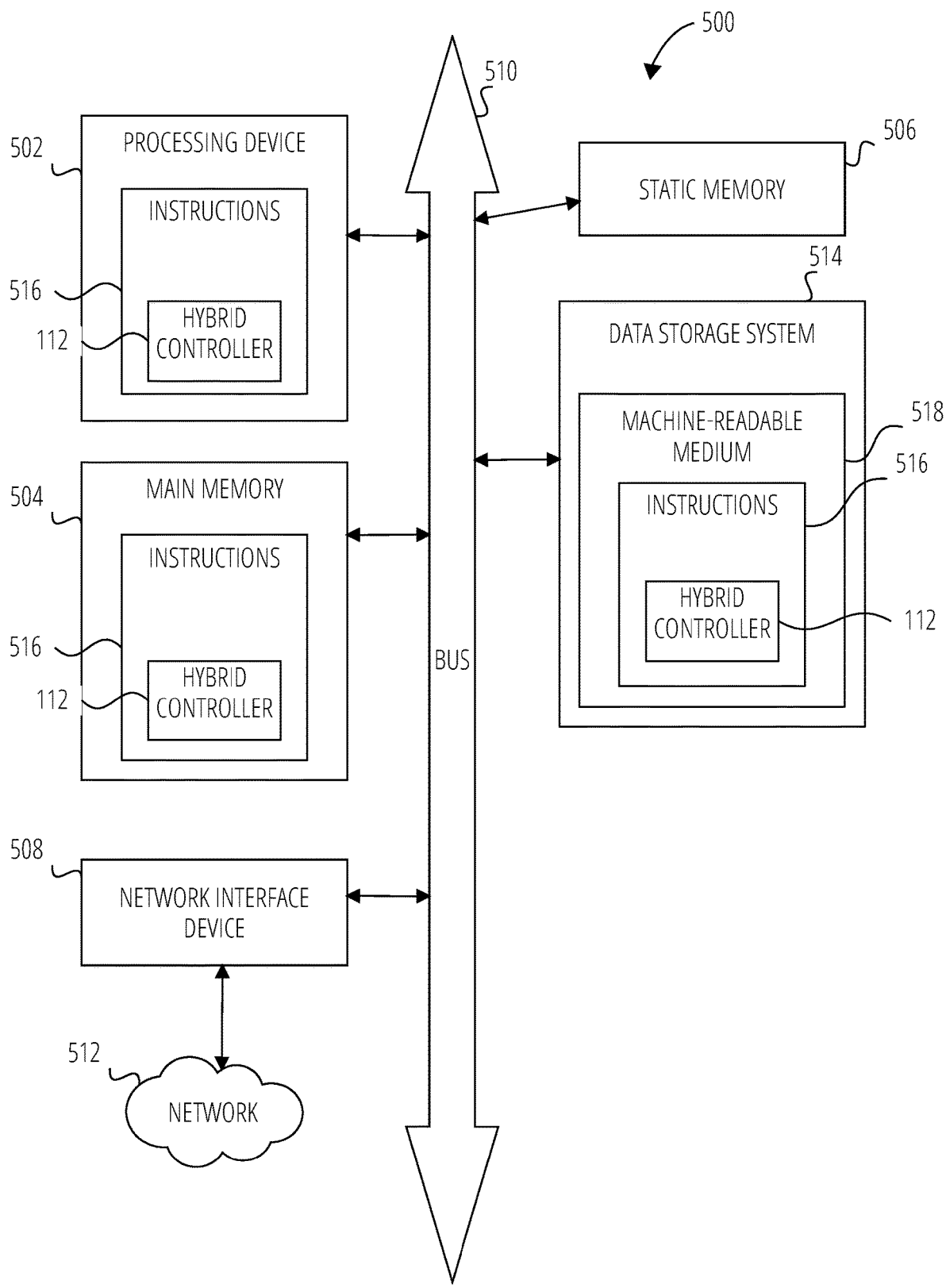
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 102 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the hybrid controller 112 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or RDRAM, etc.), a static memory 506 (e.g., flash memory, static random access memory (SRAM), etc.), and a data storage system 514, which communicate with each other via a bus 510.

Processing device 502 represents one or more general-purpose processing devices such as a microprocessor, a central processing unit, or the like. More particularly, the processing device 502 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an ASIC, a FPGA, a digital signal processor (DSP), network processor, or the like. The processing device 502 is configured to execute instructions 516 for performing the operations and steps discussed herein. The computer system 500 can further include a network interface device 508 to communicate over a network 512.

The data storage system 514 can include a machine-readable storage machine-readable medium 518 (also known as a computer-readable medium) on which is stored one or more sets of instructions 516 or software embodying any one or more of the methodologies or functions described herein. The instructions 516 can also reside, completely or at least partially, within the main memory 504 and/or within the processing device 502 during execution thereof by the computer system 500, the main memory 504 and the processing device 502 also constituting machine-readable storage media. The machine-readable storage machine-readable medium 518, data storage system 514, and/or main memory 504 can correspond to the memory sub-system 110 of FIG. 1.

In one embodiment, the instructions 516 include instructions to implement functionality corresponding to a data destruction component (e.g., the hybrid controller 112 of FIG. 1). While the machine-readable storage machine-readable medium 518 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory component that is a holographic random access memory (HRAM); and
a processing device, operatively coupled with the memory component, to perform operations comprising:
receiving instructions from a host system using a buffer manager, wherein the instructions include a plurality of smaller-sized block write instructions;
in response to determining that the smaller-sized block write instructions are associated with the HRAM,
aggregating, using an aggregation engine, the smaller-sized block write instructions from the buffer manager into a plurality of larger-sized write instructions; and
issuing a burst write instruction comprising the larger-sized write instructions to the memory component via an interface.

2. The memory sub-system of claim 1, wherein the the buffer manager comprises a buffer and a manager controller that controls contents of the buffer, wherein the contents of the buffer include data and the instructions.

3. The memory sub-system of claim 1, wherein issuing the burst write instruction comprises issuing the burst write instruction using a wide multi-client priority arbiter.

4. The memory sub-system of claim 1, wherein the aggregation engine is a hardware state machine or first-in-first-out (FIFO) engine.

5. The memory sub-system of claim 1, wherein the operations further comprise:
pre-fetching read data associated with a read instruction into the aggregation engine.

6. The memory sub-system of claim 5, wherein the operations further comprise:
prioritizing the read instruction over the smaller-sized block write instructions or the burst write instruction.

7. The memory sub-system of claim 6, wherein the operations further comprise:
interleaving the read instruction with the smaller-sized block write instructions or the burst write instruction.

8. The memory sub-system of claim 1, wherein the operations further comprise:
performing wear-leveling operations for the memory component.

9. The memory sub-system of claim 1, wherein the buffer manager is a Static Random Access Memory (SRAM) buffer manager and the interface is an HRAM modified interface.

10. The memory sub-system of claim 1, wherein the operations further comprise:
updating a non-volatile logical-to-physical mapping (L2P) table in the memory component.

11. The memory sub-system of claim 1, wherein each of the smaller-sized write instructions are between 4 bytes to 64 bytes.

12. A method comprising:
receiving, by a processing device, instructions from a host system using a buffer manager, wherein the instructions include a plurality of smaller-sized block write instructions;
in response to determining that the smaller-sized block write instructions are associated with a holographic random access memory (HRAM),
aggregating, using an aggregation engine, the smaller-sized block write instructions from the buffer manager into a plurality of larger-sized write instructions; and
issuing a burst write instruction comprising the larger-sized write instructions to a memory component via an interface.

13. The method of claim 12,
wherein the memory component is the holographic random access memory (HRAM),
wherein the buffer manager comprises a buffer and a manager controller that controls contents of the buffer, wherein the contents of the buffer include data and the instructions, and
wherein issuing the burst write instruction comprises issuing the burst write instruction using a wide multi-client priority arbiter.

14. The method of claim 12, wherein the aggregation engine is a hardware state machine or first-in-first-out (FIFO) engine.

15. The method of claim 12, further comprising:
pre-fetching read data associated with a read instruction into the aggregation engine.

16. The method of claim 15, further comprising:
prioritizing the read instruction over the smaller-sized block write instructions or the burst write instruction; and
interleaving the read instruction with the smaller-sized block write instructions or the burst write instruction.

17. The method of claim 12, further comprising:
performing wear-leveling operations for the memory component.

18. The method of claim 12, wherein the buffer manager is a Static Random Access Memory (SRAM) buffer manager and the interface is an HRAM modified interface.

19. The method of claim 12, further comprising:
updating a non-volatile logical-to-physical mapping (L2P) table in the memory component.

20. A non-transitory computer-readable storage medium comprising instructions that, when executed by a processing device, cause the processing device to perform operations comprising:
receiving instructions from a host system using a buffer manager, wherein the instructions include a plurality of smaller-sized block write instructions;
in response to determining that the smaller-sized block write instructions are associated with a holographic random access memory (HRAM),
aggregating, using an aggregation engine, the smaller-sized block write instructions from the buffer manager into a plurality of larger-sized write instructions; and
issuing a burst write instruction comprising the larger-sized write instructions to a memory component via an interface.

* * * * *